United States Patent
Natividad et al.

(10) Patent No.: US 11,750,145 B2
(45) Date of Patent: Sep. 5, 2023

(54) MODULAR SOLAR SKID WITH ENCLOSURES

(71) Applicant: OffGrid Power Solutions, LLC, Dexter, MO (US)

(72) Inventors: Marc Natividad, Cedar Hills, UT (US); Raymond Hamilton, Riverton, UT (US); Mike Mills, Columbia, MO (US)

(73) Assignee: OffGrid Power Solutions, LLC, Dexter, MO (US)

( * ) Notice: Subject to any disclaimer, the term of this patent is extended or adjusted under 35 U.S.C. 154(b) by 0 days.

(21) Appl. No.: 17/817,507

(22) Filed: Aug. 4, 2022

(65) Prior Publication Data

US 2022/0376648 A1 Nov. 24, 2022

Related U.S. Application Data (63) Continuation of application No. 17/186,782, filed on Feb. 26, 2021, now Pat. No. 11,444,570.

(60) Provisional application No. 62/983,266, filed on Feb. 28, 2020.

(51) Int. Cl.
    H02S 20/30 (2014.01)
    H02S 40/38 (2014.01)
    H02S 10/40 (2014.01)

(52) U.S. Cl.
    CPC .............. *H02S 20/30* (2014.12); *H02S 10/40* (2014.12); *H02S 40/38* (2014.12)

(58) Field of Classification Search
    None
    See application file for complete search history.

(56) References Cited

U.S. PATENT DOCUMENTS

| | | |
|---|---|---|
| 4,108,154 A | 8/1978 | Nelson |
| 4,226,256 A | 10/1980 | Hawley |
| 4,421,934 A | 12/1983 | Bluthe et al. |
| 4,421,943 A | 12/1983 | Withjack |
| 5,022,929 A | 6/1991 | Gallois-Montbrun |
| 5,125,608 A | 6/1992 | McMaster et al. |
| 5,228,924 A | 7/1993 | Barker et al. |
| 6,058,930 A | 5/2000 | Shingleton |
| 6,201,181 B1 | 3/2001 | Azzam et al. |
| 7,105,940 B2 | 9/2006 | Weesner et al. |
| 7,230,819 B2 | 6/2007 | Muchow et al. |
| 7,252,083 B2 | 8/2007 | Hayden |
| 7,301,095 B2 | 11/2007 | Murphy et al. |
| 7,476,832 B2 | 1/2009 | Vendig et al. |
| 7,492,120 B2 | 2/2009 | Benn et al. |
| 7,513,250 B2 | 4/2009 | Head et al. |
| 7,647,924 B2 | 1/2010 | Hayden |
| 7,749,380 B2 | 7/2010 | Yungner et al. |
| 7,884,279 B2 | 2/2011 | Dold et al. |
| 7,888,590 B2 | 2/2011 | Niederer |
| 8,299,645 B2 | 10/2012 | Muchow et al. |
| 8,469,022 B2 | 6/2013 | Cowan et al. |
| 8,539,724 B2 | 9/2013 | Bullivant et al. |
| 8,544,221 B2 | 10/2013 | Marley |

(Continued)

*Primary Examiner* — Daniel P Malley, Jr.
(74) *Attorney, Agent, or Firm* — Armstrong Teasdale LLP (57) ABSTRACT

A modular solar skid includes a base including a skid, a panel support structure extending from the skid, at least one solar panel coupled to the panel support structure, and at least one enclosure coupled to the skid. The at least one enclosure is located within a cavity defined between the skid and the panel support structure.

15 Claims, 13 Drawing Sheets

(56) References Cited

U.S. PATENT DOCUMENTS

| | | |
|---|---|---|
| 8,601,755 B2 | 12/2013 | Clarkson et al. |
| 8,607,513 B2 | 12/2013 | Anderson |
| 8,664,511 B2 | 3/2014 | Swatek et al. |
| 8,844,214 B2 | 9/2014 | Hartelius |
| 8,854,794 B2 | 10/2014 | Van Straten |
| 9,046,281 B2 | 6/2015 | Curran |
| 9,121,189 B2 | 9/2015 | Hixson et al. |
| 9,166,521 B2 | 10/2015 | Durney et al. |
| 9,166,525 B2 | 10/2015 | Grant |
| 9,246,035 B2 | 1/2016 | Eaton, Jr. |
| 9,287,822 B2 | 3/2016 | Levi et al. |
| 9,309,910 B2 | 4/2016 | Anderson et al. |
| 9,312,414 B2 | 4/2016 | Tlzhoefer |
| 9,379,660 B2 | 6/2016 | Al-Haddad et al. |
| 9,422,922 B2 | 8/2016 | SantAnselmo et al. |
| 9,425,732 B2 | 8/2016 | Durney et al. |
| 9,471,050 B2 | 10/2016 | Tilley et al. |
| 9,479,110 B2 | 10/2016 | Patton |
| 9,490,384 B1 | 11/2016 | Strahm |
| 9,503,016 B2 | 11/2016 | Sakai et al. |
| 9,553,544 B2 | 1/2017 | Nayar |
| 9,559,232 B1 | 1/2017 | Naud et al. |
| 9,564,851 B2 | 2/2017 | Conger |
| 9,612,039 B2 | 4/2017 | Meppelink et al. |
| 9,657,967 B2 | 5/2017 | Adriani et al. |
| 9,718,334 B2 | 8/2017 | Means |
| 9,784,476 B2 | 10/2017 | Stein |
| 9,819,304 B2 | 11/2017 | Feng |
| 9,882,067 B2 | 1/2018 | Britcher et al. |
| 9,917,546 B2 | 3/2018 | Sade |
| 9,960,730 B2 | 5/2018 | Sinclair et al. |
| 10,014,820 B2 | 7/2018 | Brennan |
| 10,020,772 B1 | 7/2018 | Puri et al. |
| 10,024,579 B1 | 7/2018 | Govar et al. |
| 10,164,565 B1 | 12/2018 | Borgstrom |
| 10,236,820 B2 | 3/2019 | Schmidt |
| 10,250,181 B2 | 4/2019 | Vietas et al. |
| 10,250,183 B2 | 4/2019 | Edmunds |
| 10,367,443 B2 | 7/2019 | Bailey et al. |
| 10,367,446 B2 | 7/2019 | Tanaka |
| 10,371,328 B2 | 8/2019 | Poage |
| 10,374,117 B2 | 8/2019 | Wolter et al. |
| 10,396,703 B2 | 8/2019 | Niimi |
| 10,432,132 B2 | 10/2019 | Reilly et al. |
| 2009/0084429 A1 | 4/2009 | Sureda Alsina et al. |
| 2009/0165841 A1 | 7/2009 | Gunn, Jr. et al. |
| 2010/0207452 A1 | 8/2010 | Saab |
| 2010/0212659 A1 | 8/2010 | Carpoff |
| 2010/0236183 A1 | 9/2010 | Cusson et al. |
| 2011/0023864 A1 | 2/2011 | Andretich |
| 2011/0132353 A1 | 6/2011 | Gumm et al. |
| 2011/0214667 A1 | 9/2011 | Baruh |
| 2011/0220176 A1 | 9/2011 | Halpern et al. |
| 2011/0290307 A1 | 12/2011 | Workman et al. |
| 2012/0080072 A1* | 4/2012 | Bullivant ............... H02S 40/36 136/246 |
| 2012/0186632 A1 | 7/2012 | Reinhold et al. |
| 2013/0056991 A1 | 3/2013 | Petersen et al. |
| 2013/0111830 A1 | 5/2013 | Aseere et al. |
| 2013/0192658 A1 | 8/2013 | Tseng et al. |
| 2013/0206708 A1 | 8/2013 | Lessard |
| 2013/0247962 A1 | 9/2013 | Sakai et al. |
| 2014/0026941 A1 | 1/2014 | Kim |
| 2014/0028241 A1 | 1/2014 | Hixson |
| 2014/0083488 A1 | 3/2014 | Song et al. |
| 2014/0215953 A1 | 8/2014 | Sawaki |
| 2014/0285005 A1 | 9/2014 | Casteel |
| 2015/0001201 A1 | 1/2015 | Adler et al. |
| 2015/0144178 A1 | 5/2015 | Sakai et al. |
| 2015/0207451 A1 | 7/2015 | Patton |
| 2015/0222220 A1 | 8/2015 | Laitila et al. |
| 2015/0288319 A1 | 10/2015 | Hartman et al. |
| 2016/0060890 A1 | 3/2016 | Van Wyk |
| 2016/0118929 A1 | 4/2016 | Krause |
| 2016/0134231 A1 | 5/2016 | Wu et al. |
| 2016/0197575 A1* | 7/2016 | Armstrong ............... H02B 1/28 320/101 |
| 2016/0261226 A1 | 9/2016 | Hamilton et al. |
| 2016/0329857 A1 | 11/2016 | Du |
| 2016/0380581 A1 | 12/2016 | Kawakatsu |
| 2017/0104441 A1 | 4/2017 | Swan |
| 2017/0222475 A1 | 8/2017 | Van Straten |
| 2017/0244355 A1 | 8/2017 | Yanagi |
| 2017/0313470 A1 | 11/2017 | Britcher et al. |
| 2018/0062572 A1 | 3/2018 | Kunesh |
| 2018/0091088 A1 | 3/2018 | Barton et al. |
| 2018/0212551 A1 | 7/2018 | Polk |
| 2018/0278199 A1 | 9/2018 | Chang |
| 2019/0006984 A1 | 1/2019 | Albertella |
| 2019/0052224 A1 | 2/2019 | Schatz et al. |
| 2019/0158013 A1 | 5/2019 | Boguess et al. |
| 2019/0267929 A1 | 8/2019 | Carrington |
| 2019/0280641 A1 | 9/2019 | Owen |
| 2019/0393826 A1* | 12/2019 | Lai ............ H02S 20/30 |
| 2020/0119683 A1* | 4/2020 | Milder ............ H02S 10/20 |
| 2020/0127485 A1* | 4/2020 | Friesen ............ H02S 10/40 |
| 2020/0144824 A1* | 5/2020 | Campus ............ H02J 13/0017 |

* cited by examiner

MODULAR SOLAR SKID WITH ENCLOSURES

CROSS-REFERENCE TO RELATED APPLICATIONS

This application is a continuation of U.S. application Ser. No. 17/186,782, filed on Feb. 26, 2021, which claims the benefit of priority to U.S. Provisional Patent Application No. 62/983,266, filed Feb. 28, 2020, each of which is hereby incorporated by reference in its entirety.

BACKGROUND

The present disclosure is directed to solar skids, and more specifically, to modular solar skids.

More organizations are seeking environmentally friendly solutions for power usage and energy consumption. For example, businesses are exploring solar energy to fulfill their energy needs. In addition, solar energy can be useful in situations where accessing a traditional power grid is difficult.

BRIEF DESCRIPTION OF THE DISCLOSURE

In one aspect, a modular solar skid includes a base including a skid, a panel support structure extending from the skid, and at least one solar panel coupled to the panel support structure. The skid and the panel support structure define a cavity therebetween, and the modular solar skid further includes at least one enclosure coupled to the skid within the cavity.

In another aspect, a cluster of modular solar skids includes a plurality of modular solar skids. Each modular solar skid includes a base including a skid, a panel support structure extending from the skid, and at least one solar panel support structure, and at least one enclosure coupled to the skid. The skid and the panel support structure define a cavity therebetween, and the modular solar skid further includes at least one enclosure coupled to the skid within the cavity. The plurality of modular solar skids includes a first solar skid including a battery enclosure and an electronics enclosure, wherein the battery enclosure houses a plurality of batteries and the electronics enclosure houses data processing electronics. The plurality of modular solar skids also includes a plurality of second solar skids in electrical communication with the first solar skid, each of the plurality of second solar skids including a ballast enclosure housing a ballast material therein.

DETAILED DESCRIPTION

In the following specification and the claims, reference will be made to a number of terms, which shall be defined to have the following meanings. The singular forms "a," "an," and "the" include plural references unless the context clearly dictates otherwise. The terms "comprising," "including," and "having" are intended to be inclusive and mean that there may be additional elements other than the listed elements. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Figure 1:
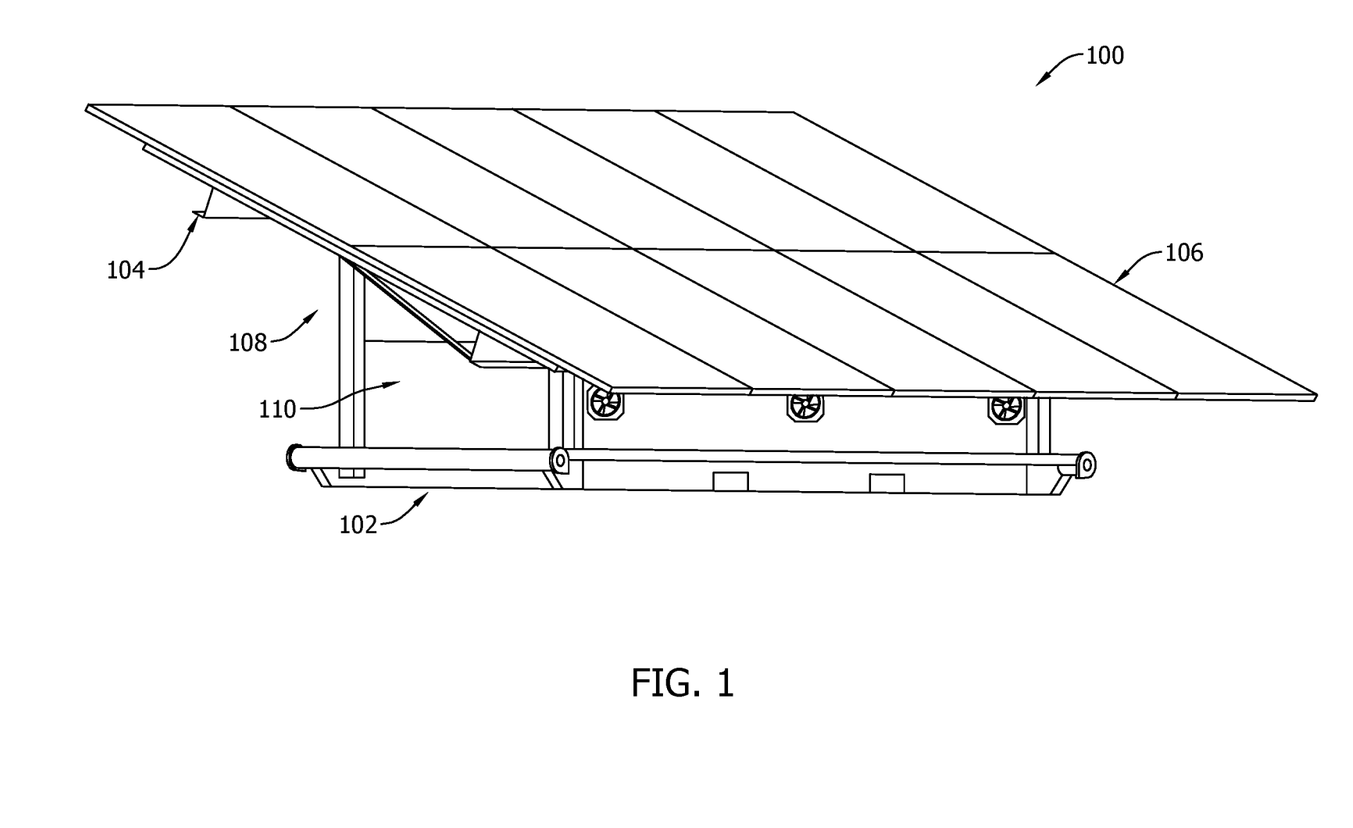
FIG. 1 is a perspective view of a first exemplary embodiment of a modular solar skid in accordance with the present disclosure.

FIG. 1 is a perspective view of an exemplary modular solar skid 100. In the illustrated embodiment, the modular solar skid 100 includes a base, which is embodied as a skid 102. Although not shown, it is contemplated that in an alternative embodiment, the base may be embodied as a wheeled trailer or other base suitable for facilitating transportation of modular solar skids. The modular solar skid 100 also includes a panel support structure 104 extending from the skid 102. In the exemplary embodiment, the panel support structure 104 extends substantially vertically from the skid 102. The modular solar skid 100 further includes at least one solar panel 106 coupled to the panel support structure 104. A cavity 108 is defined by the area between the skid 102 and the panel support structure 104. The modular solar skid 100 further includes at least one enclosure 110 arranged or positioned within the cavity 108 and, in the exemplary embodiment, coupled to the skid 102. The at least one enclosure 110 includes at least one of a battery enclosure 112, a primary electronics enclosure 114 (both shown in FIG. 2), or a ballast enclosure 202 (shown in FIGS. 4 and 5), each of which is described further herein.

Figure 2:
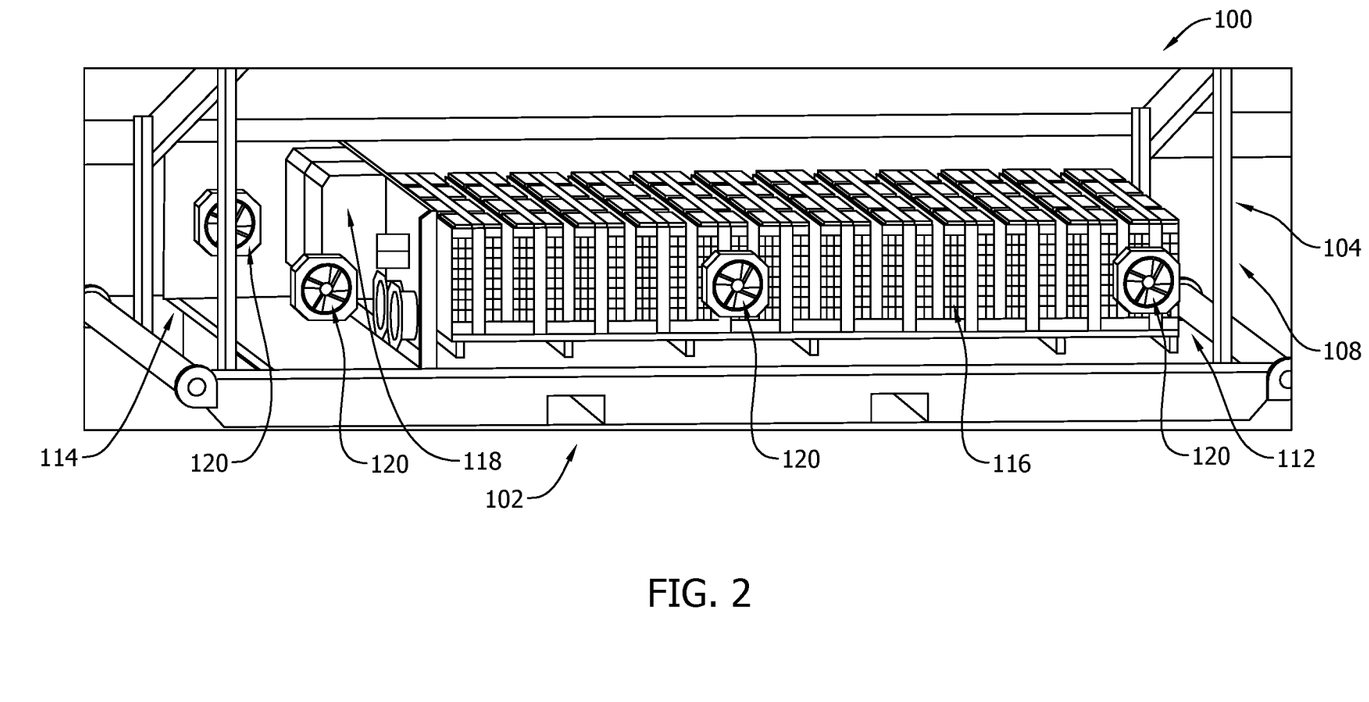
FIG. 2 is a rear cutaway view of the modular solar skid shown in FIG. 1, illustrating a battery enclosure and a primary electronics enclosure.

FIG. 2 is a rear cutaway view of a first configuration of the modular solar skid 100 shown in FIG. 1. The first configuration of the modular solar skid 100 includes a battery enclosure 112 and an electronics enclosure 114 arranged within the cavity 108. Specifically, within the cavity 108, at least one battery enclosure 112 is coupled to the skid 102 adjacent to a primary electronics enclosure 114. The battery enclosure 112 is configured to retain a plurality of batteries 116 therein. The primary electronics enclosure 114 is configured to retain at least one of a computing device, a processor, a memory, a server, data processing electronics, or a blockchain server 118. Any of these components are powered using power stored in the plurality of batteries 116. These features enable the modular solar skid 100 to power or control other modular solar skids as well as other external systems (not shown). The primary electronics enclosure 114 may additionally or alternatively include control electronics that enable the modular solar skid to power and/or control other systems via an AC or DC current. The AC configuration, as shown in FIG. 2, includes at least one inverter (not specifically shown) to power the other system(s). In an alternative embodiment, for example, in a DC current configuration, the modular solar skid 100 does not include an inverter. Furthermore, in some embodiments at least one of the battery enclosure 112 and the primary electronics enclosure 114 include a ventilation system 120. The ventilation system 120 includes one or more fans, which are powered using power stored in the plurality of batteries 116. The ventilation system 120 is configured to prevent components in a corresponding enclosure from overheating (e.g., by expelling hot air from inside the battery enclosure 112 and/or the primary electronics enclosure 114) and/or keep components from freezing (e.g., by circulating warmed air within an enclosure).

Figure 3:
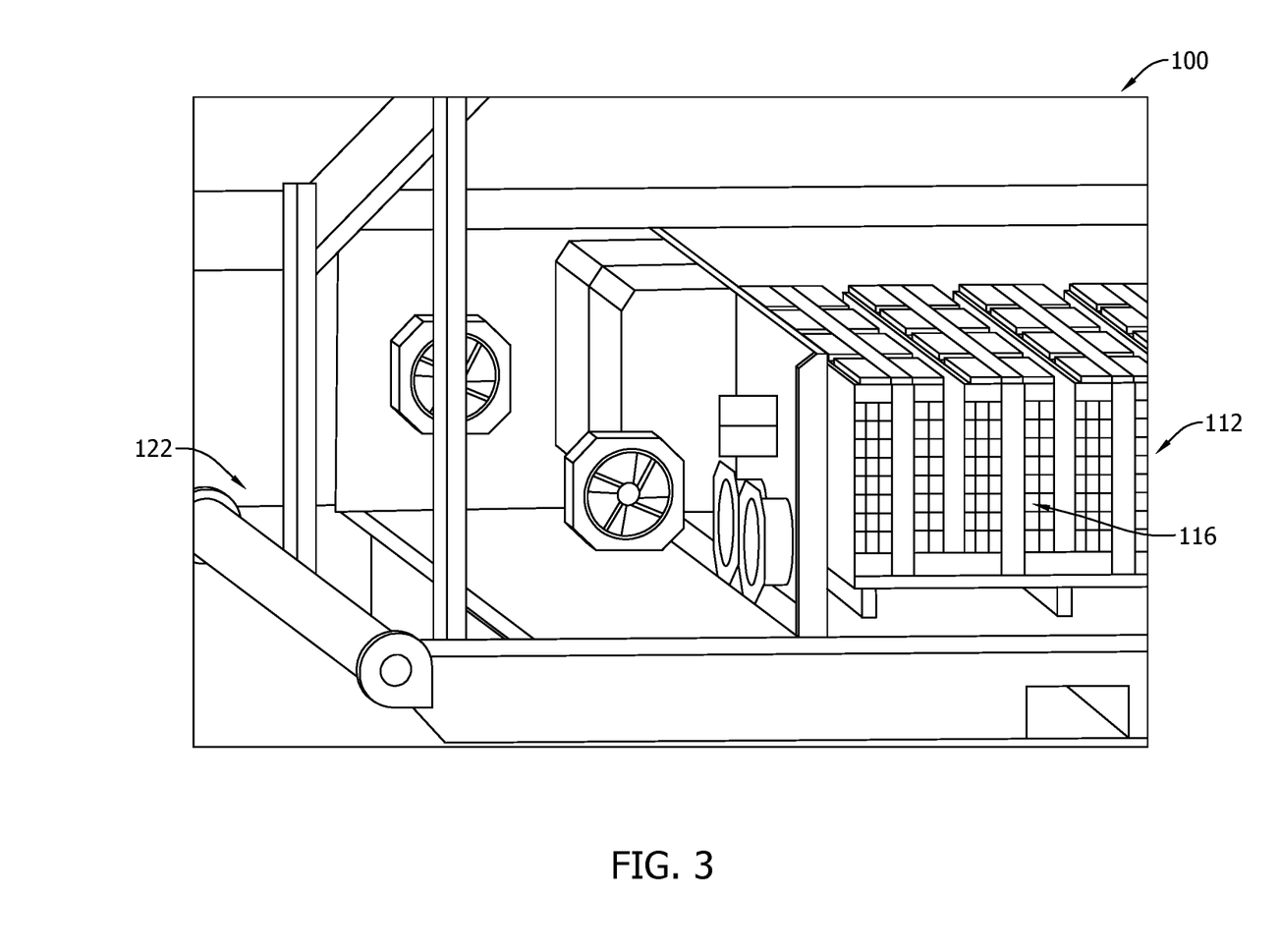
FIG. 3 is a rear cutaway view of the modular solar skid shown in FIG. 1, illustrating a secondary electronics enclosure and a battery enclosure.

FIG. 3 is a rear cutaway view of a second configuration of the modular solar skid 100 shown in FIG. 1. In the second configuration, the modular solar skid 100 includes a secondary electronics enclosure 122 and at least one battery enclosure 112. Specifically, within the cavity 108, at least one battery enclosure 112 is coupled to the skid 102 adjacent to one secondary electronics enclosure 122. The secondary electronics enclosure 122 may include no on-board electronics. Alternatively, the secondary electronics enclosure 122 may include electronics (e.g., blockchain servers) that are controlled by control electronics in a primary electronics enclosure 114 of another modular solar skid 100. In some embodiments, the secondary electronics enclosure 122 is smaller than the (primary) electronics enclosure 114 (shown in FIG. 2), such that the battery enclosure 112 is larger and accommodates a greater number of batteries 116 therein. In the exemplary embodiment, electronics enclosures 114, 122 are water-tight to reduce the risk of water damage to the electronics housed therein. Likewise, the battery enclosure 112 is water-tight to reduce the risk of water damage to the batteries 116 housed therein.

Figure 4:
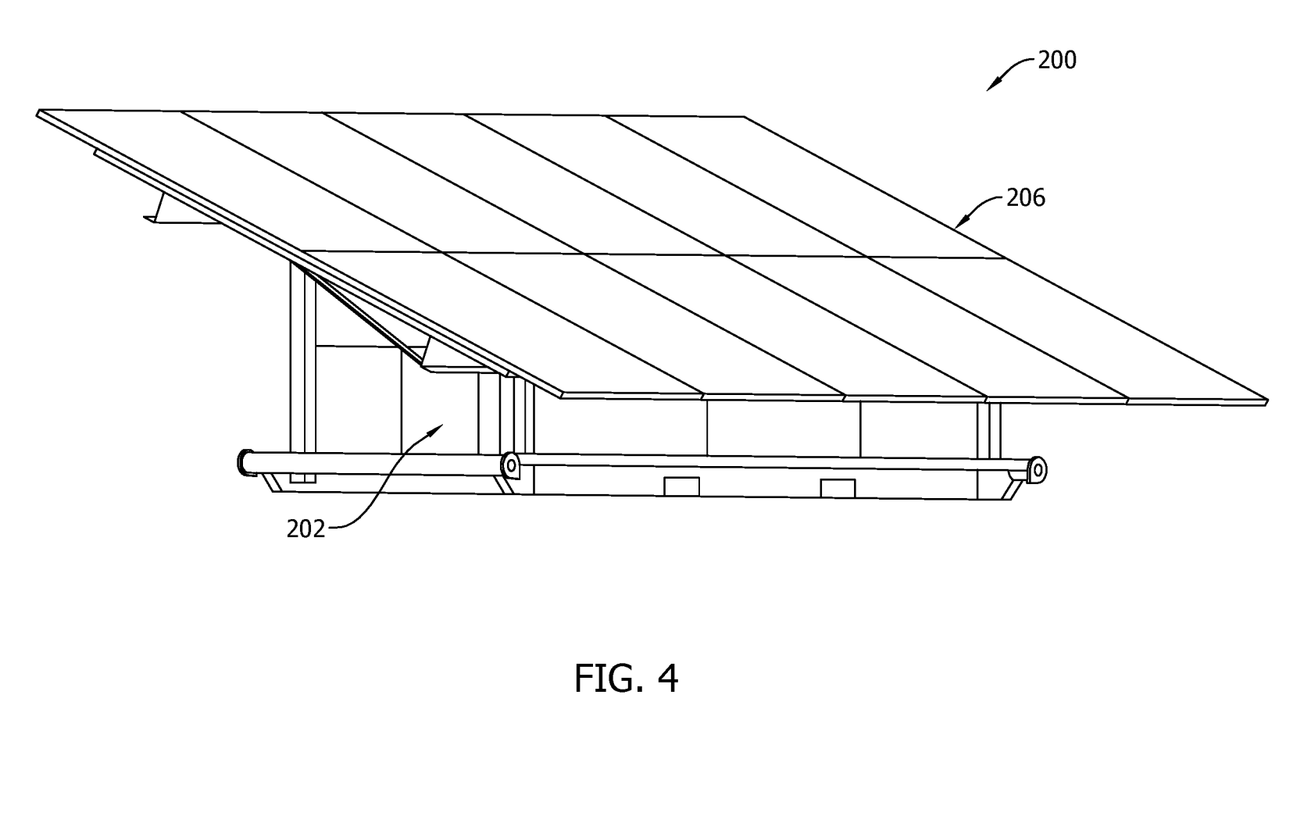
FIG. 4 is a perspective view of a second exemplary embodiment of a modular solar skid, including a ballast enclosure.
Figure 5:
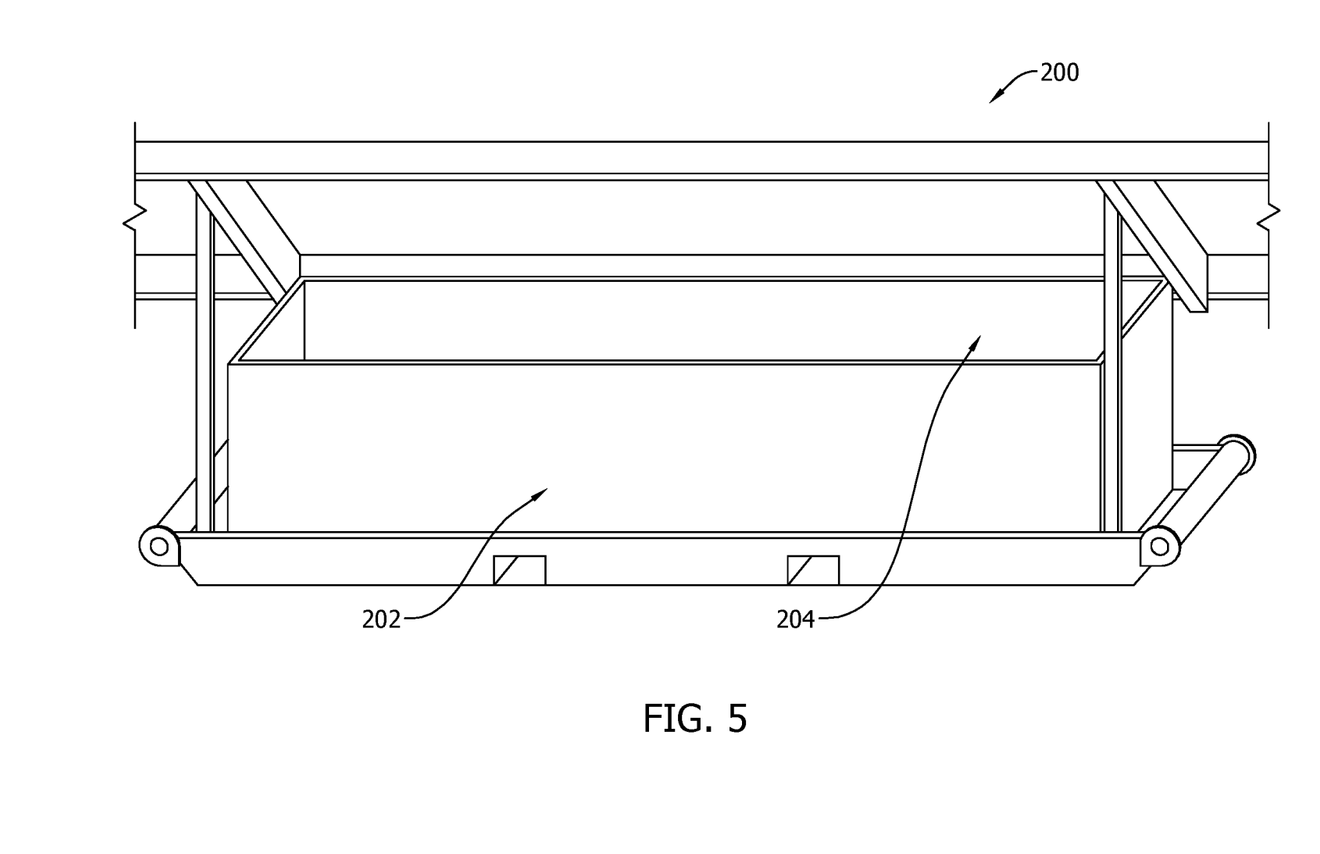
FIG. 5 is a rear view of the modular solar skid shown in FIG. 4.

FIGS. 4 and 5 are a perspective view and a rear view, respectively, of a second embodiment of a modular solar skid 200 that includes a ballast enclosure 202. The modular solar skid 200 does not include a battery enclosure or an electronics enclosure. The ballast enclosure 202 defines storage space 204 for ballast material (not shown), such as sand, dirt, or concrete, in the modular solar skid. Because there are no battery or electronics enclosures, a ventilation system is not necessary. The modular solar skid 200 is electrically coupled to one or more of the modular solar skids 100 shown in FIGS. 1-3, such that energy collected by the solar panel(s) 206 is stored in the batteries 116 of the other modular solar skids 100. Modular solar skids 200 may be used, for example, in locations where it is difficult or undesirable to break ground to install conventional solar panels (e.g., on landfill sites). In such cases, the use of a ballasted modular solar skid 200 enables efficient installation of solar panels without the need to break ground. For example, the solar skid may be delivered to the site and positioned as desired (e.g., using a forklift, trailer, etc.). Thereafter, the ballast material may be delivered to the same location and positioned atop the skid 102, to ballast the modular solar skid 200.

Figure 6:
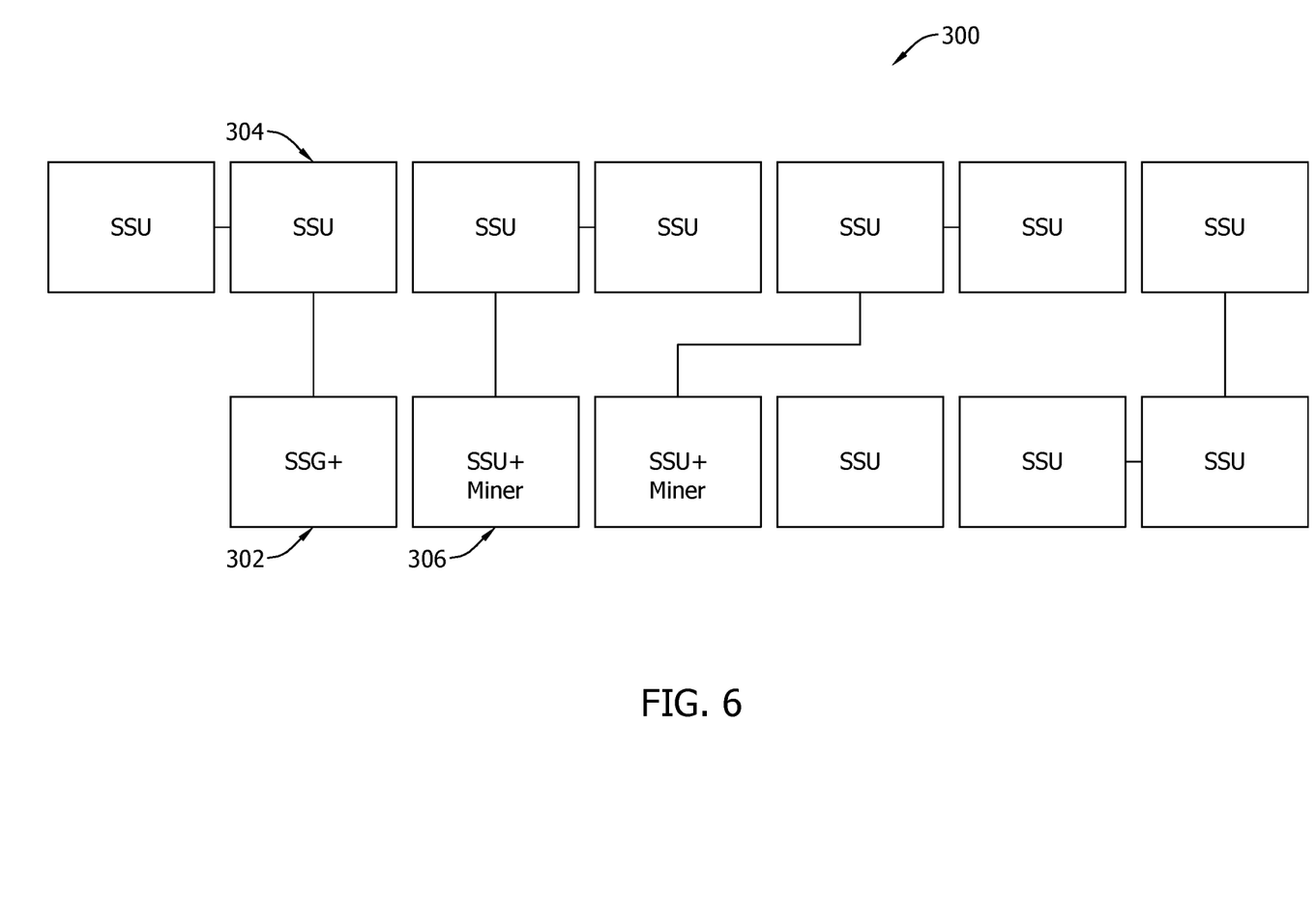
FIG. 6 is an exemplary embodiment of a cluster of modular solar skids.

FIG. 6 is an exemplary embodiment of a cluster of modular solar skids 300. The cluster of modular solar skids 300 comprises a plurality of modular solar skids. The plurality of modular solar skids includes one or more of a first solar skid 302, such as the modular solar skids 100 shown in FIGS. 1-3. The first solar skid 302 includes at least one battery enclosure 112 and at least one primary electronics enclosure 114, wherein the battery enclosure 112 houses a plurality of batteries 116 and the primary electronics enclosure 114 houses data processing electronics, such as at least one of a computing device, a processor, a memory, a server, data processing electronics, or a blockchain server 118, as well as control electronics. The at least one first solar skid 302 may also include another modular solar skid including at least one battery enclosure 112 and at least one secondary electronics enclosure 122, where the secondary electronics enclosure 122 houses data processing electronics but no control electronics. The plurality of modular solar skids also includes a plurality of second solar skids 304, such as the modular solar skids 200 shown in FIGS. 4 and 5, in electrical communication with the first solar skid 302, each of the plurality of second solar skids 304 including a ballast enclosure 202 housing a ballast material therein. This illustrated cluster 300 has the ability to power at least one modular solar skid 306, such as the modular solar skid 100, shown in FIG. 3. In this specific embodiment, the first solar skid 302 utilizes an AC current configuration to power the cluster 300; however, in some embodiments, the first solar skid 302 utilizes a DC current configuration to power the cluster 300. The modular solar skids are arranged in various clusters and configurations and are at least one of electronically or communicatively coupled together (e.g., via wired and/or wireless power and/or data links).

Figure 7:
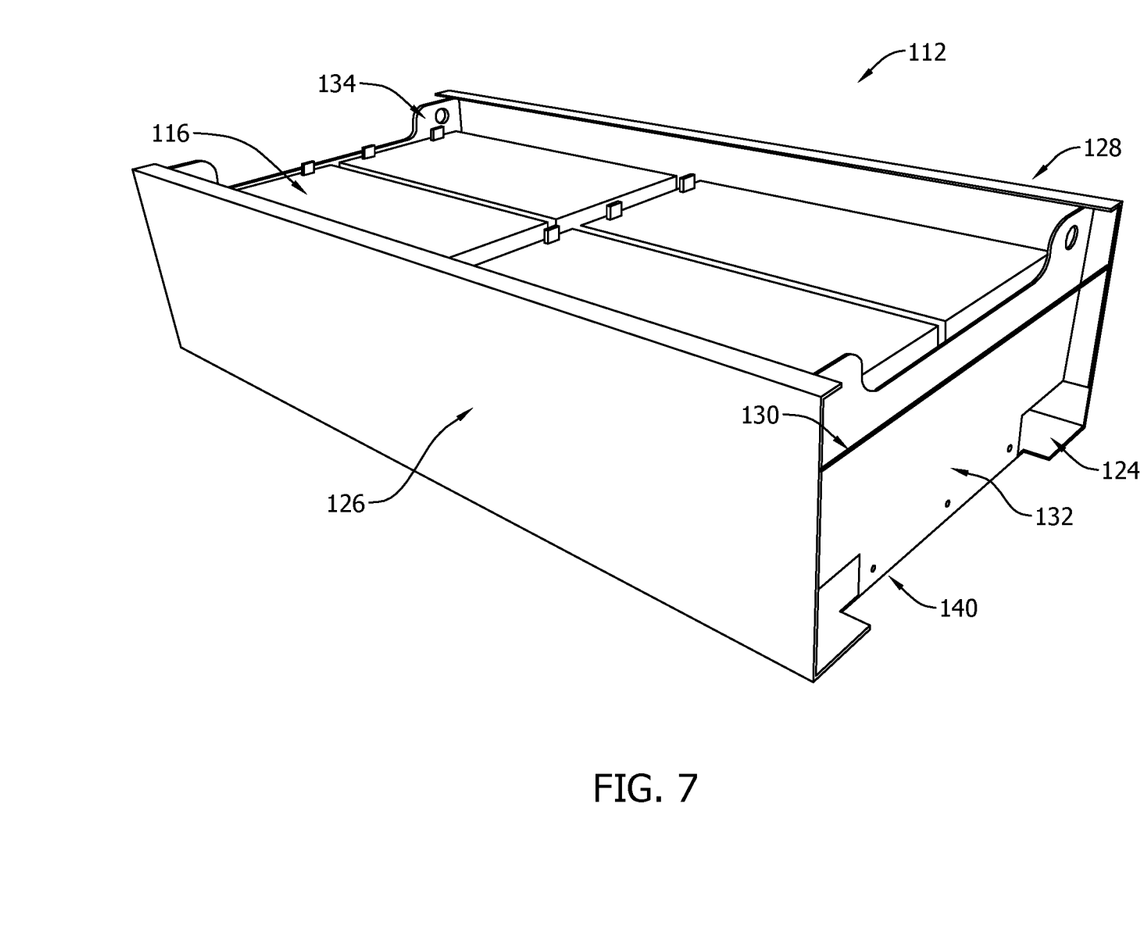
FIG. 7 is a perspective view of an exemplary battery enclosure.
Figure 8:
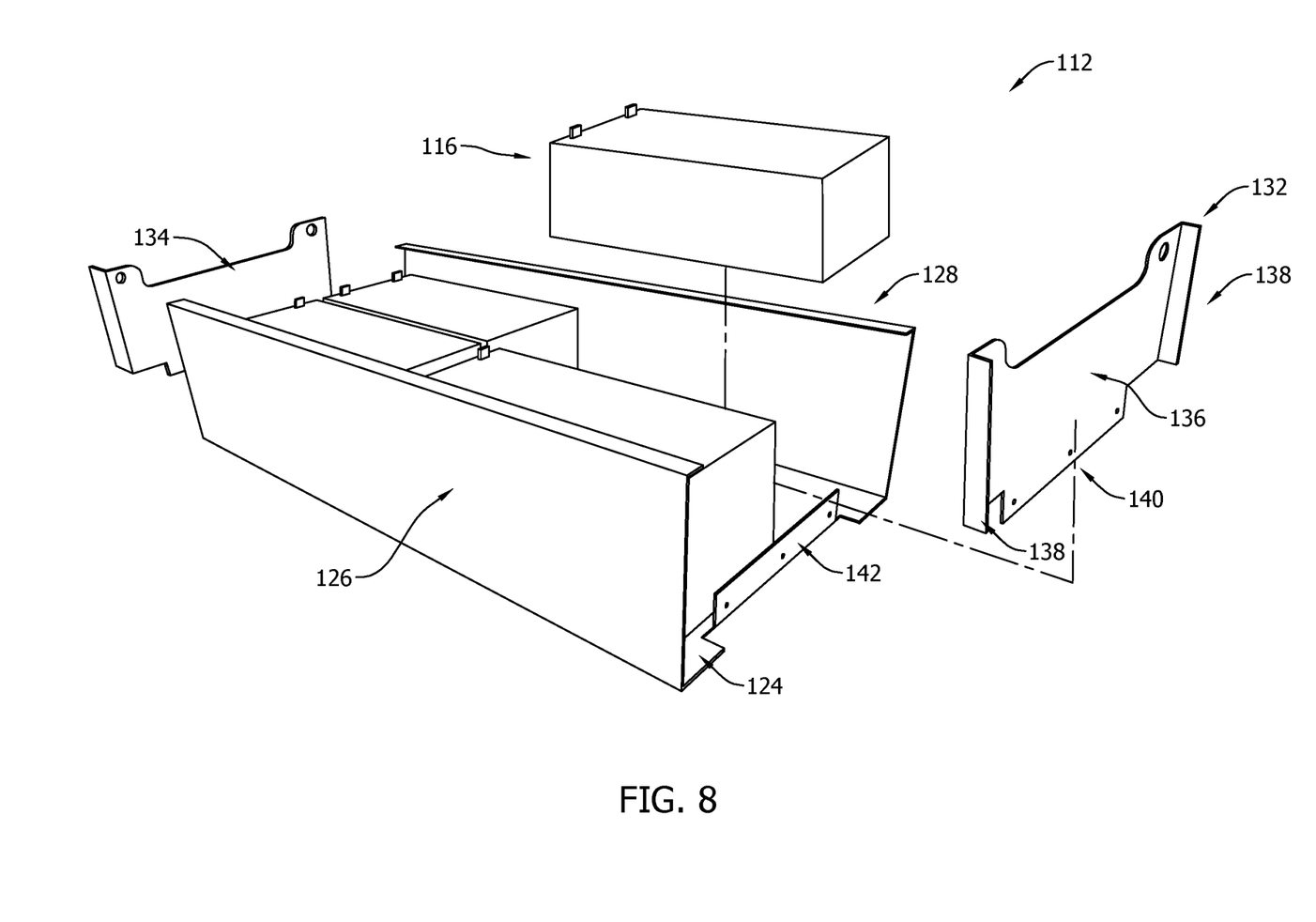
FIG. 8 is an exploded view of the battery enclosure shown in FIG. 7.

FIG. 7 is a perspective view of an exemplary battery enclosure 112, and FIG. 8 is an exploded view of the battery enclosure 112. The battery enclosure 112 includes a bottom wall 124, a first side wall 126 extending parallel to a longitudinal axis of the skid 102 and perpendicular to the bottom wall 124, a second side wall 128 extending parallel to the first side wall 126 and spaced from the first side wall 126 by a first distance 130, a first end wall 132 removeably coupled to the first side wall 126 and second side wall 128, and a second end wall 134 removeably coupled to the first side wall 126 and second side wall 128. Furthermore, in some embodiments the first distance 130 is at least two times a width of one battery of the plurality of batteries 116, such that two or more batteries 116 are arranged side-by-side between the side walls 126, 128 within the battery enclosure 112.

The first end wall 132 of the battery enclosure 112 includes a planar wall plate 136, a pair of attachment flanges 138 extending perpendicularly from the planar wall plate 136, and a planar extension 140. The attachment flanges 138 extend perpendicularly from the planar wall plate 136 and are configured to be removeably attached to the first and second side walls 126, 128 (e.g., via plurality of fasteners).

The planar extension 140 is coupleable to the bottom wall 124 of the battery enclosure 112. Specifically, the bottom wall 124 includes an attachment flange 142 to which the planar extension 140 of the first end wall 132 is coupled. The second end wall 134 is substantially the same as the first end wall 132. The first and second end walls 132, 134 are detachable from the side walls and the bottom wall 124, which enables easier access to the batteries 116 in the battery enclosure 112.

Figure 9:
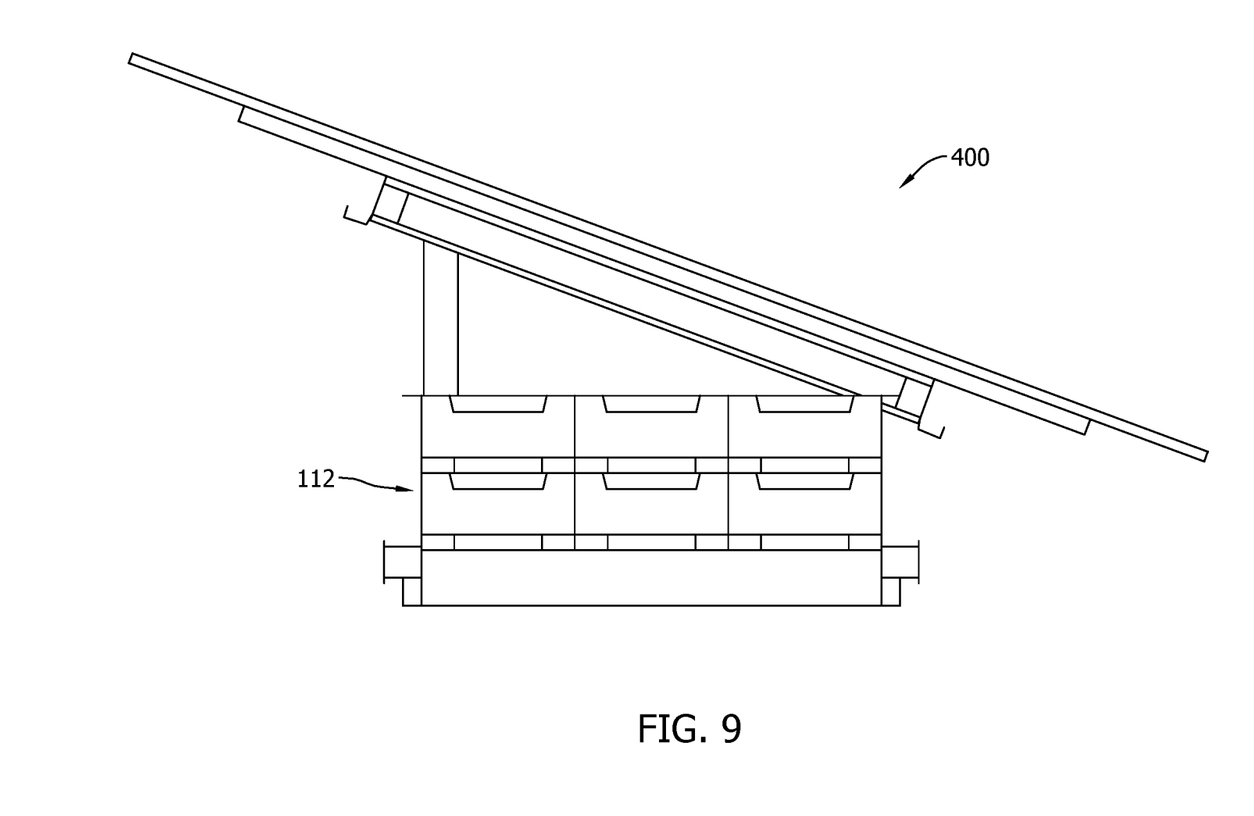
FIG. 9 is a side view of the modular solar skid shown in FIG. 1 with stacked battery enclosures.
Figure 10:
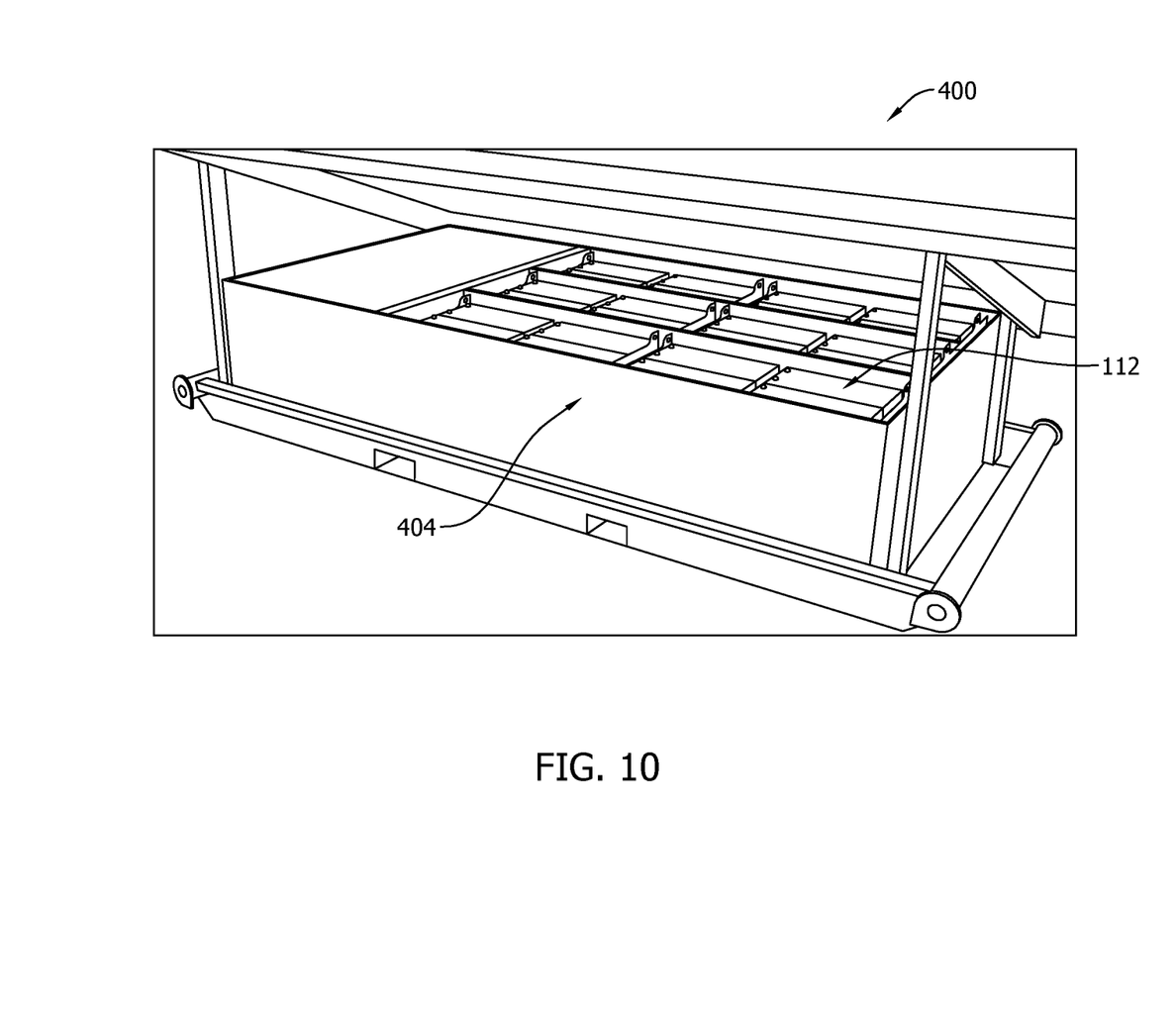
FIG. 10 is a rear view of the modular solar skid shown in FIG. 1 with stacked battery enclosures.
Figure 11:
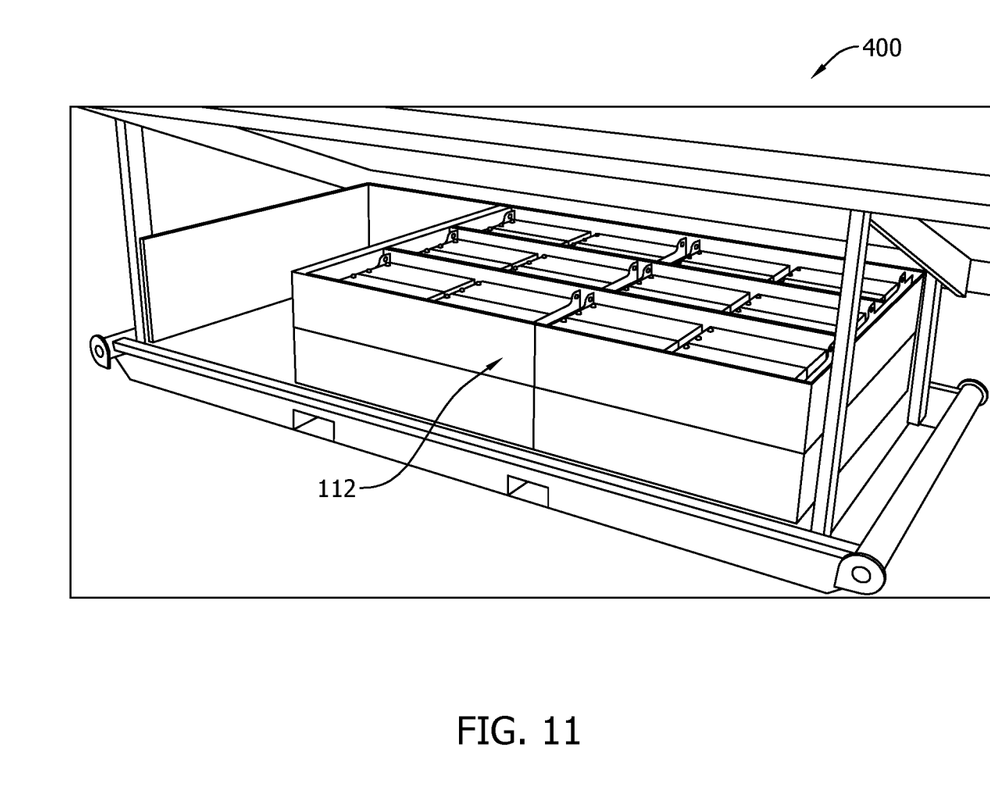
FIG. 11 is a rear sectional view of the modular solar skid shown in FIG. 1 with stacked battery enclosures.

FIG. 9 is a side view of the modular solar skid 400 with a plurality of stacked battery enclosures 112. FIG. 10 is a rear view of the modular solar skid 400 with stacked battery enclosures 112 retained within an enclosure housing 404, and FIG. 11 is a rear sectional view of the modular solar skid 400, illustrating the stacked battery enclosures 112 with a portion of the enclosure housing 404 removed.

Figure 12:
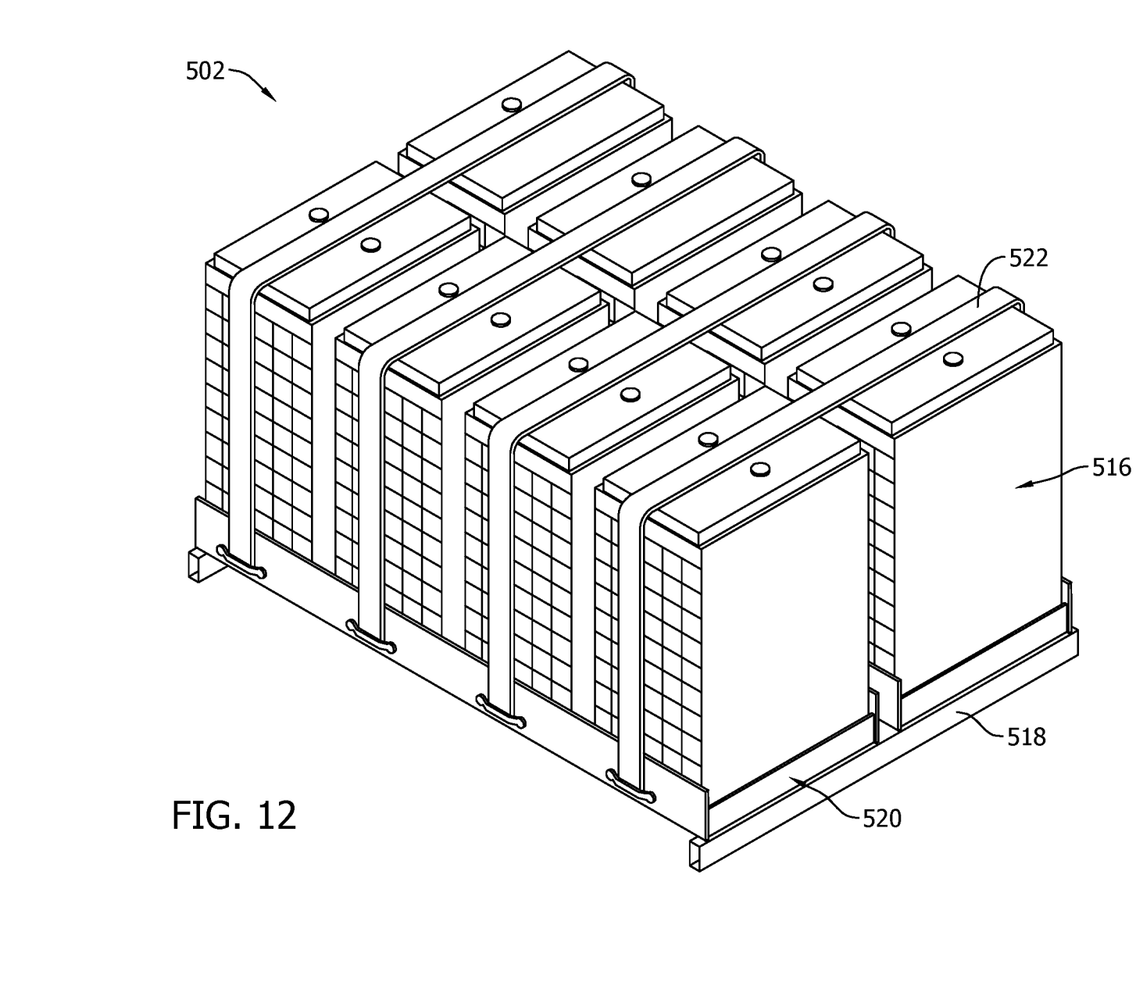
FIG. 12 is a perspective view of an alternative collection of batteries for use with a modular solar skid.
Figure 13:
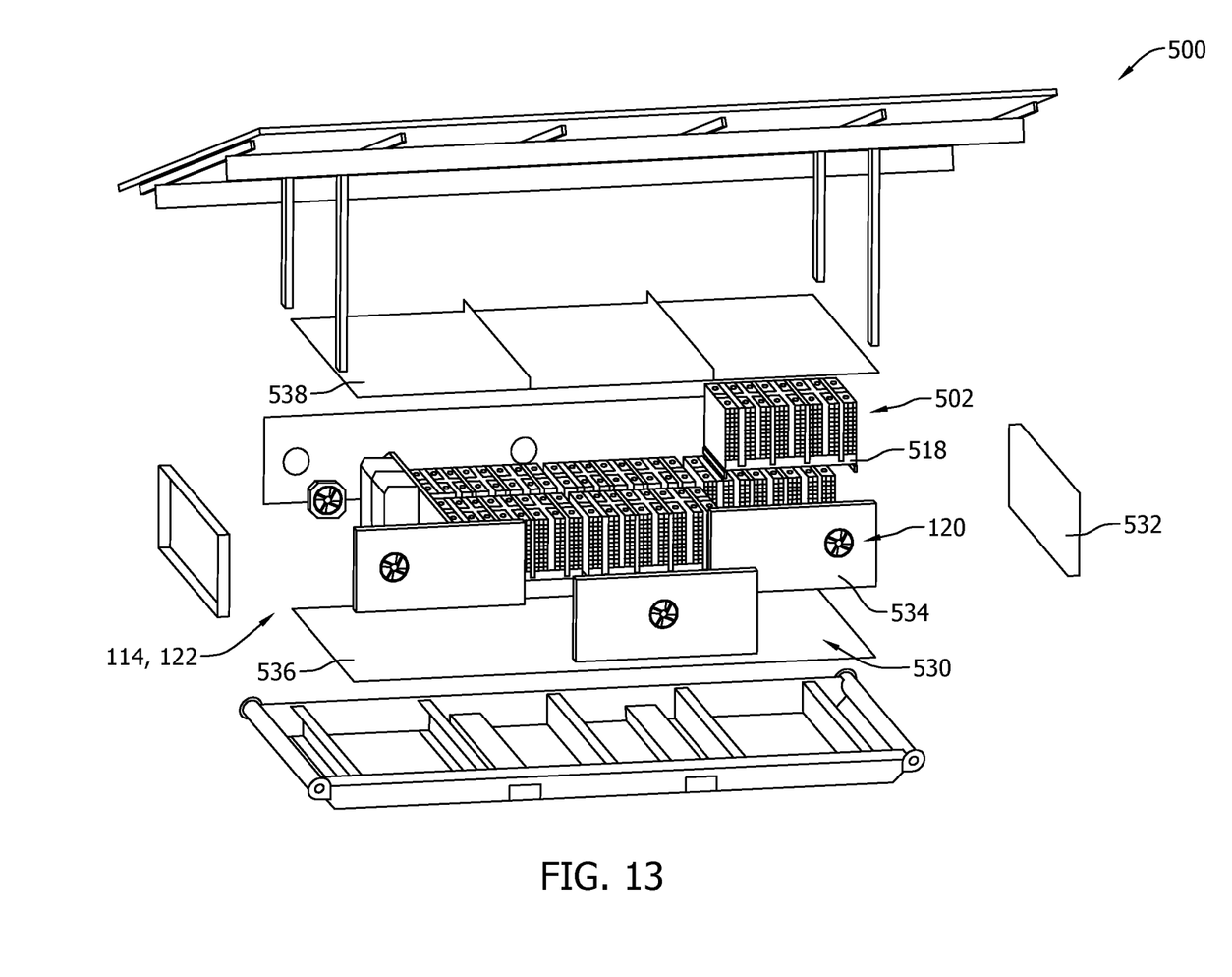
FIG. 13 is an exploded view of a modular solar skid including the collection of batteries shown in FIG. 12 in an alternative battery enclosure.

FIGS. 12 and 13 illustrate an alternative collection 502 of batteries 516 and a modular solar skid 500 including such a collection of batteries within an alternative battery enclosure 512. In at least some embodiments, the batteries 516 include two-Volt batteries; in other embodiment, the batteries 516 may have other voltages, depending on the particular design of the system of modular solar skids 500. The batteries 516 are positioned on a sub-skid 518 and arranged thereon in a two-by-four array. In particular, the sub-skid 518 includes a plurality of slots 520 corresponding to the number and layout of the batteries 516. Therefore, it should be readily understood that any number or arrangement of batteries 516 may be realized, in various embodiments, depending on the size of the sub-skid 518 and the batteries 516. A plurality of straps 522 couple the batteries 516 to the sub-skid 518. In this arrangement, any single battery 516 or any number of batteries 516 may be readily removed from the sub-skid 518 for replacement thereof, by removing the respective strap 522 and removing/replacing the battery 516 from the sub-skid 518. Moreover, the wiring of the batteries 516 to associated electronics (not shown in FIG. 12) may be simplified or reduced, compared to other battery arrangements.

As shown in FIG. 13, a plurality of collections 502 of batteries 516 are arranged in a battery enclosure 530. Specifically, in the illustrated embodiment, eight collections 502 are positions in the battery enclosure 530 in a single-layer two-by-four array. In this way, every battery 516 is accessible within the battery enclosure 530 for inspection, removal, and/or replacement thereof. The battery enclosure 530 includes end walls 532, side walls 534, and a ventilation system 120. The battery enclosure 530 is positioned adjacent to an electronics enclosure 114/122 as described above. A bottom wall 536 and a top wall 538 extend across both enclosures of the modular solar skid 500.

In some embodiments, the modular solar skid 500 (and/or the modular solar skid 100 or the modular solar skid 200) is configured to collect up to 50 kW of solar power (e.g., about 46.15 kW) per cluster of solar skids (e.g., as shown in FIG. 6), and can produce about 20 kVA of AC power with about 6,240 AH AGM of battery power from the batteries 516. The modular solar skids described herein may be enabled with wireless (e.g., WiFi, cellular, etc.) communication capabilities for remote monitoring and/or control thereof. Some such modular solar skids may be equipped with alarms, fault alerts, and/or shutdown features (e.g., email, text/SMS, cellular alerts). The modular solar skids described herein may be constructed of 12-gauge (2 mm) hot-dip galvanized steel and may be configured to withstand up to about 105 mph (168 kmph) winds. Notably, however, each modular solar skid, and any cluster thereof (e.g., as shown in FIG. 6) may be readily customized depending on the desired application. For example, the number and mixture of skids, the skid size, the number of panels per skid, solar panel size, the number and characteristics of batteries and/or inverters used, the type of electronics housed, the construction of the skids, and the angle of the panels (e.g., fixed or single-axis tracking) may each be varied.

Exemplary embodiments of mats are not limited to the specific embodiments described herein, but rather, components of mats may be utilized independently and/or separately from other components described herein. Although specific features of various embodiments of the disclosure may be shown in some drawings and not in others, this is for convenience only. In accordance with the principles of the disclosure, any feature of any drawing may be referenced and/or claimed in combination with any feature of any other drawing.

What is claimed is:

1. A cluster of modular solar skids comprising:
a plurality of modular solar skids comprising:
a first solar skid including a first battery enclosure and a primary electronics enclosure, wherein the first battery enclosure houses a first plurality of batteries and the primary electronics enclosure houses control electronics;
a second solar skid in electrical communication with the first solar skid, the second solar skid including a second battery enclosure and a secondary electronics enclosure, wherein the second battery enclosure houses a second plurality of batteries and the secondary electronics enclosure houses no control electronics, wherein the second battery enclosure is larger than the first battery enclosure and the second plurality of batteries is greater than the first plurality of batteries, and wherein the secondary electronics enclosure is smaller than the primary electronics enclosure; and
a plurality of third solar skids in electrical communication with the first solar skid, each of the plurality of third solar skids including a ballast enclosure housing a ballast material therein,
wherein functionality of the second solar skid and the plurality of third solar skids is controlled by the control electronics in the first solar skid, wherein the first solar skid and the second solar skid have the same footprint.

2. The cluster of modular solar skids of claim 1, wherein each of the plurality of modular solar skids respectively comprises:
a base comprising a skid;
a panel support structure extending from the skid; and
at least one solar panel coupled to the panel support structure, wherein the skid and the panel support structure define a cavity therebetween.

3. The cluster of modular solar skids of claim 1, wherein the first battery enclosure and the primary electronics enclosure of the first solar skid are water-tight.

4. The cluster of modular solar skids of claim 1, wherein the first solar skid and the second solar skid each include a respective includes a ventilation system.

5. The cluster of modular solar skids of claim 1, wherein the first plurality of batteries includes a first plurality of collections of batteries, each collection of batteries comprising a sub-skid with a subset of the first plurality of batteries coupled thereto.

6. The cluster of modular solar skids of claim 1, wherein the plurality of modular solar skids are electronically and communicatively coupled together.

7. The cluster of modular solar skids of claim 5, wherein each sub-skid includes a plurality of slots corresponding to the subset of the first plurality of batteries.

8. The cluster of modular solar skids of claim 7, wherein each sub-skid includes a plurality of straps, wherein each strap couples one battery of the first plurality of batteries to the sub-skid within a corresponding slot of the plurality of slots.

9. The cluster of modular solar skids of claim 7, wherein the primary battery enclosure comprises:
   a bottom wall;
   a first side wall extending parallel to a longitudinal axis of the skid and perpendicular to the bottom wall;
   a second side wall extending parallel to the first side wall and spaced from the first side wall by a first distance;
   a first end wall removeably coupled to the first and second side walls at a first end of the first and second side walls; and
   a second end wall removeably coupled to the first and second side walls at an opposing second end of the first and second side walls.

10. The cluster of modular solar skids of claim 9, wherein the first end wall comprises:
    a planar wall plate;
    a pair of attachment flanges extending perpendicularly from the wall plate and configured to be removeably attached to the first and second side walls; and
    a planar extension configured to be removeably attached to the bottom wall.

11. The cluster of modular solar skids of claim 7, wherein the primary battery enclosure comprises a plurality of battery sub-enclosures, wherein each battery sub-enclosure respectively comprises:
    a bottom wall;
    a first side wall extending parallel to a longitudinal axis of the skid and perpendicular to the bottom wall;
    a second side wall extending parallel to the first side wall and spaced from the first side wall by a first distance;
    a first end wall removeably coupled to the first and second side walls at a first end of the first and second side walls; and
    a second end wall removeably coupled to the first and second side walls at an opposing second end of the first and second side walls.

12. The cluster of modular solar skids of claim 11, wherein the plurality of battery sub-enclosures are arranged in a three-dimensional array.

13. The cluster of modular solar skids of claim 2, wherein the control electronics are powered using the first plurality of batteries.

14. The cluster of modular solar skids of claim 4, wherein the ventilation system of the first solar skid is powered using the first plurality of batteries, and wherein the ventilation of the second solar skid is powered using the second plurality of batteries.

15. The cluster of modular solar skids of claim 1, wherein the primary electronics enclosure is configured to house at least one of a computing device, a processor, a memory, a server, data processing electronics, or a blockchain server.

* * * * *